United States Patent [19]

Frankel

[11] Patent Number: 4,540,239

[45] Date of Patent: Sep. 10, 1985

[54] LIGHTED MAGNIFYING LENS DEVICE

[76] Inventor: Betty S. Frankel, 2325 S. Linden St., #106N, Denver, Colo. 80222

[21] Appl. No.: 535,816

[22] Filed: Sep. 26, 1983

[51] Int. Cl.³ .............................................. G02B 27/02
[52] U.S. Cl. ..................................... 350/235; 350/248
[58] Field of Search ................................. 350/235–238, 350/248–249; 40/367, 904; 240/359.1

[56] References Cited

U.S. PATENT DOCUMENTS

| | | | |
|---|---|---|---|
| 1,130,689 | 3/1915 | Atkinson | 350/248 |
| 1,556,510 | 10/1925 | King | 350/249 |
| 1,567,439 | 12/1925 | Heitzler | 350/247 |
| 2,122,753 | 7/1938 | Ridabock | 350/248 |
| 2,531,585 | 11/1950 | Pope | 350/249 |
| 2,541,760 | 2/1951 | Harrison | 350/248 |
| 2,771,003 | 11/1956 | Lyndall et al. | 350/248 |
| 2,803,919 | 8/1957 | Abraham | 350/237 |
| 3,462,111 | 8/1969 | Stokes | 248/359.1 |
| 3,753,610 | 8/1973 | Samuel | 350/248 |
| 3,955,884 | 5/1976 | Del Pesco, Sr. | 350/248 |
| 4,468,873 | 9/1984 | Ozeki | 350/235 |

FOREIGN PATENT DOCUMENTS 2821002  11/1979  Fed. Rep. of Germany ...... 350/238

OTHER PUBLICATIONS

Edroy, "New All Purpose Magnifier", advertisement from Edroy Products Co. in Review of Optometry, 2-15-1963, p. 57.

Primary Examiner—William H. Punter
Attorney, Agent, or Firm—Jack C. Sloan

[57] ABSTRACT

A curved trough shaped housing reflects light from a light mounted within a housing to an external workspace located under a magnifying lens attached to the housing. An adjustable mounting of the lens to the housing allows for variation of the user's viewing angle through the lens so that handicraft, reading and similar close work can be carried out in a constantly well lit, optically magnified workspace without extreme downward bending of the user's neck. The distance from the eyes to the lens is adjusted by varying the length of a cord which supports the device from the user's neck.

7 Claims, 4 Drawing Figures

LIGHTED MAGNIFYING LENS DEVICE

BACKGROUND OF THE INVENTION

This invention relates generally to magnifying lenses, and more particularly to magnifying lenses suspended from the user's neck.

Prior art magnifying lenses adapted for hanging from the user's neck are well represented by U.S. Pat. Nos. 2,122,753 and 3,753,610. Such lenses are generally used under a reading lamp placed above the chair in which the user is sitting while performing needlepoint, darning, knitting, crocheting, and similar handicraft work as well as reading or any other close work functions which may require magnification of the workpiece, such as, for example, precision assembly, machining or grinding operations.

Under these prior art overhead lighting arrangements, users of neck supported magnifying lenses encounter a number of light-related problems. For example, overhead lighting is often just not bright enough in the workspace under the lens. This usually results in either moving the light closer to the user or the user moving closer to the light or in eyestrain. The use of more intense or focused overhead light sources does not always solve the problem because bright lights tend to produce glaring reflections of the light itself in the lens. This is annoying and even harmful to the user's vision. Furthermore, even if the user does obtain the proper workpiece and magnifying lens orientation to an adequate overhead lighting source, there are usually occasions when the user's head must be bent closer to the lens for better observation of particularly close work. Aside from being very tiring on the neck muscles, this downward bending of the head usually blocks out a portion of the overhead light and creates a distracting shadow over the workspace. Even if particularly close work is not required, the user is constantly required to find and laboriously hold the body position where the workpiece, the lens and the overhead light are in a precise relationship. Change, however, is inevitable. The progress of the work itself produces change; the user must reach for another tool, or perform some auxiliary work function; or perhaps the work must be taken to an entirely new workstation. Each such change requires a new orientation to the light and thus contributes to user eyestrain and fatigue.

Lighted, hand-held magnifying lenses of the type taught in U.S. Pat. No. 2,384,528 have not solved the handicraft worker's lighting problems because use of one hand is lost in holding such lenses. Furthermore, this type lens does not provide sufficient, uniform vertical depth of light in the workspace. This is because their light and their lens are in substantially the same horizontal plane. Therefore, their light is not delivered substantially perpendicular to the vertical optical field of the lens to provide the desired uniformly lit depth in the workspace, but rather their light is delivered at some lesser angle. This lesser angle can create problems in that as the angle between the vertical optical field, the workpiece and the light source decreases, the greater becomes the likelihood that light reflected from the workpiece will shine directly back into the user's eyes. This type of lighted lens also lacks the capability of varying the angle between the lens and the light source, i.e., the light and the lens remain in the same plane as the lens is tilted toward or away from the workpiece. The end result of these conditions is that use of these hand-held, lighted lenses is generally restricted to two dimensional horizontal work such as reading, rather than use in a three dimensional workspace where both hands must be employed in order to work on a workpiece requiring three dimensional work operations.

Therefore, the primary object of this invention is to provide an adequate, uniform, low reflection generating light to the workspace under a neck supported magnifying lens regardless of the user's head position, and thereby reducing the fatigue normally associated with close work. Another object is to provide the user with the capability of carrying the workpiece with both hands to a new work station while holding the light in the workspace nearly constant in the new workpiece location.

Figure 1:
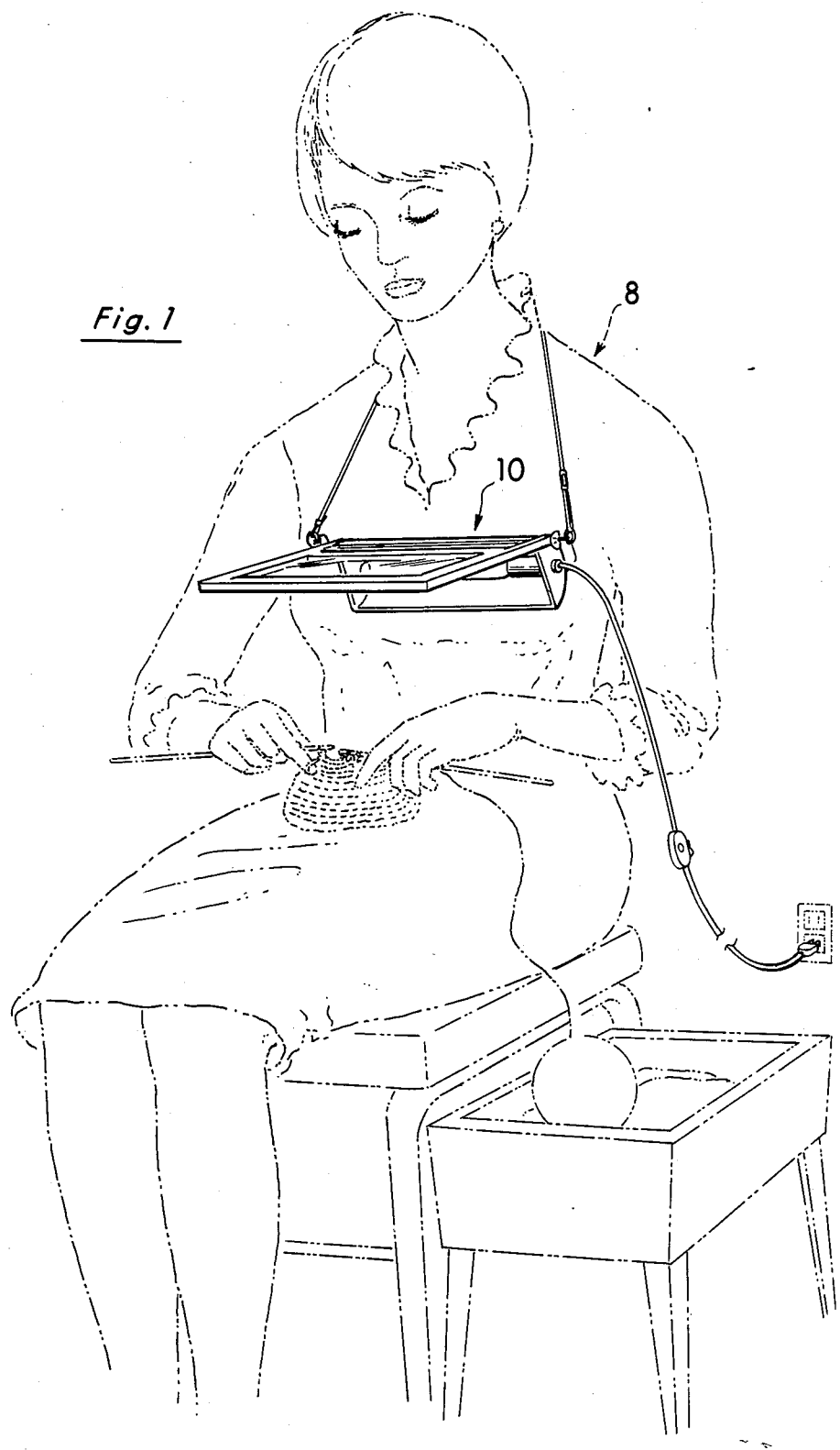
FIG. 1 is a perspective view of the device shown in relation to the body of a user.

Referring now to FIG. 1, there is illustrated a user 8 making use of the device of this invention 10 to facilitate handicraft work such as knitting.

Figure 2:
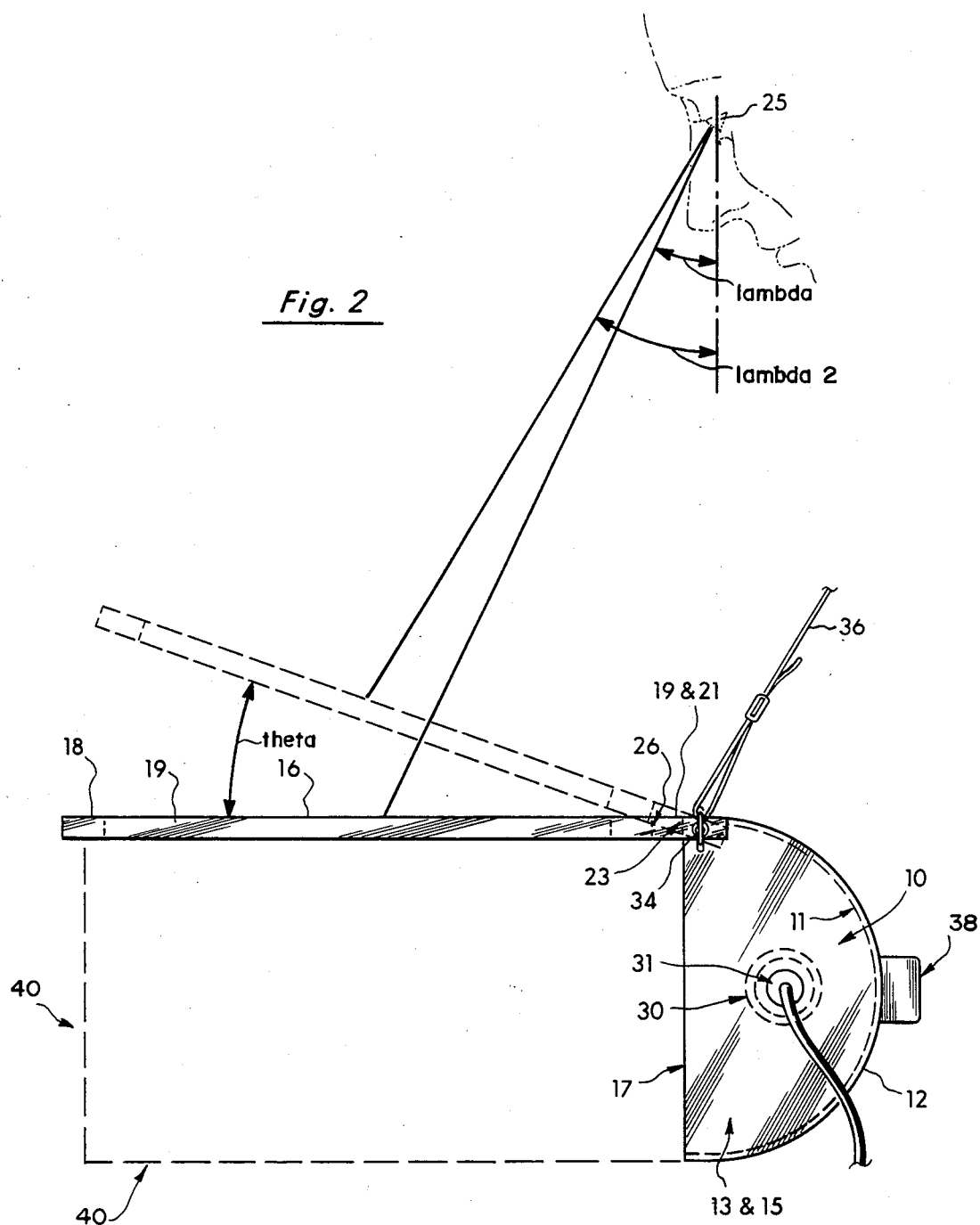
FIG. 2 is a side view of the device showing the light reflecting capability of the concave trough shaped housing, the adjustable angle between the mounting and the housing and a preferred location for attaching the suspension cords to the device.
Figure 3:
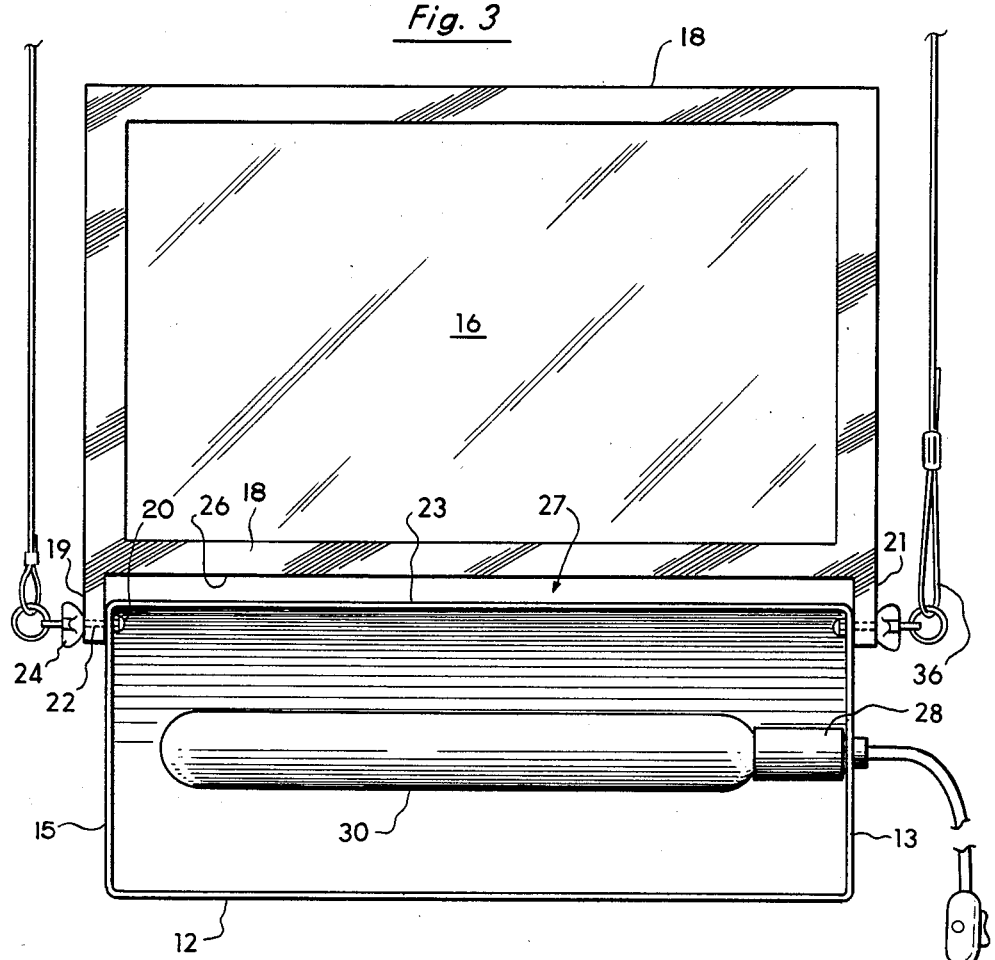
FIG. 3 is a front view showing a preferred location for the light source within the housing.

As shown in FIGS. 2 and 3, the device 10 includes a trough shaped housing 12 having endpieces 13 and 15 and a front opening 17. The housing can be any convenient trough shape such as a square, a trapezoid or a smooth curve such as the one shown in FIG. 2. Semicircular, hyperbolic or parabolic forms are preferred in that they provide greater reflective surface area and it may be of particular advantage to locate a light source such as a light bulb 30 at the focus 31 of such smooth curves for maximum reflection from the inside surface 11 of the trough which most preferably has a non-opaque light reflective color and quality. In any event, light shines perpendicular to and/or is reflected substantially perpendicular to a workspace 40 located outside the front 17 of the trough 12 and underneath a lens 16 mounted in a lens frame 18 having arms 19 and 21. The arms 19 and 21 are in turn adjustably mounted, preferably at respective endpieces 13 and 15, to the housing 12. The arms 19 and 21 are of sufficient length to allow the rear edge 26 of the lens frame 18 to clear the top front edge 23 of the housing 12 when the lens frame 18 is raised from the essentially horizontal position shown in solid lines in FIG. 2 to a new position represented in dotted lines at an angle theta from the horizontal so that the user's viewing angle is increased from lambda, to lambda 2 in order to alleviate downward bending of the user's eyes 25 and hence downward bending of the user's neck. Movement of the lens frame 18 is about pivot point 34 by known means such as a bolt or friction fitting more fully described hereinafter.

A slide prevention bar 38 is attached to the outside rear of the housing to prevent rotational as well as side-to-side sliding of the housing 12 with respect to the user's chest. The bar 36 can be attached to the outside rear of the housing 12 by any convenient method such as gluing or bolting. The bar can be of any material, but light, semi-rigid foams such as styrofoam are preferred since they have a high coefficient of friction which prevents slipping on the user's clothing and serve as insulation having a low coefficient of heat transfer with respect to any heat generated by the light source 30, which is preferably a low heat producing light source.

FIG. 3 is a front view showing the lens 16 positioned in the lens frame 18 having arms 19 and 21. A single lens is shown but this single lens could, of course, be replaced by two or more lens having differing magnification powers or by a lens having an area of more intense magnification in the manner of a bifocal eyeglass lens. In any event, the front view of FIG. 3 shows a space 27 between the rear edge 26 of the lens frame 18 and the top edge 23 of the housing 12 so that the lens frame may be raised to an angle theta as shown in FIG. 2. A light bulb base 28 is shown attached to end piece 13 of the housing 12. The light base 28 holds a light bulb 30, preferably one having an elongated shape as shown.

The adjustable mounting between the lens frame arm 19 and the endpiece 15 of the housing 12 can be accomplished by a number of ways. A preferable method, however, is by means of a pivot type fitting such as the bolt 22 extending through the lens frame arm 19 and endpiece 15. The bolt head 20 is preferably on the inside and a hand operated locking nut, wing tip nut, or nut with hand operated lever, etc., is positioned on the outside of the respective endpieces 19 and 21 for ease of operation. By way of example, FIG. 3 shows a wing tip nut 24 as the means of locking the lens frame 18 at some desired angle theta.

Figure 4:
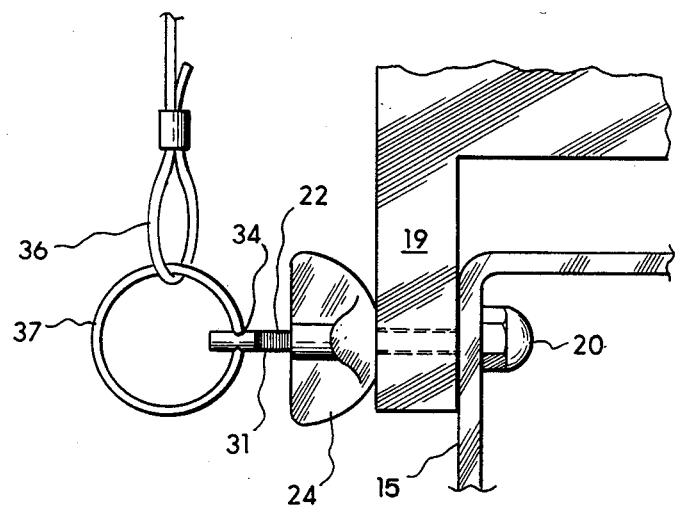
FIG. 4 is a detail of a preferred fitting for adjustably mounting the lens to the housing.

FIG. 4 shows a side view detail of a preferred arrangement for locking the lens frame arm 19 in position with respect to the endpiece 13. A bolt 22 having a head 20 extends through both the endpiece 15 and the lens frame arm 19 and ends in a threaded portion 31 which threads to a wing tip nut 24. Preferably, the end of the threaded end of the bolt 31 is further provided with a hole 34 into which a wire ring 37 is inserted so that it does not interfere with the wing tip as it rotates about the bolt axis. A cord 36 can be tied to the ring 37 for support of the entire device 10 about the user's neck.

What is claimed is:

1. In a magnifying device supported by a cord means slung around the user's neck, wherein the improvement comprises, in combination:
    a trough shaped housing for reflecting light from a light bulb mounted within the housing to a workspace located in front of the trough opening and underneath a magnifying lens adjustably mounted in relation to the top of the housing;
    slide prevention means located on the outside of the rear of the housing;
    lens means in a frame which is adjustably mounted to the housing to allow for variation in the angle between the housing and the lens frame.

2. The magnifying device of claim 1 wherein the trough shaped housing has a curved reflecting surface.

3. The magnifying device of claim 1 wherein the light bulb is mounted to one end of the housing and has an elongated tube configuration.

4. The magnifying device of claim 1 wherein the slide prevention means is made of a semi-rigid material having a high coefficient of friction and a low coefficient of heat transfer.

5. The magnifying device of claim 1 wherein the adjustable mounting of the lens frame to the housing is accomplished by means of a bolt extending through each respective end of the housing, through an adjacent arm of the lens frame and to a hand operated locking device which provides for easy variation of the angle between the lens frame and the housing and for locking the lens frame at the desired angle.

6. The magnifying device of claim 1 wherein the cord means is attached to the device in the vicinity of the hand operated locking means which comprises a wing nut.

7. In a magnifying device supported by a cord means slung around the user's neck, wherein the improvement comprises, in combination:
    a curved trough shaped housing having a smooth non-opaque colored inside surface for reflecting light from a low heat producing, elongated light bulb mounted at one end of the inside of the housing to a workspace located in front of the trough opening and underneath a magnifying lens adjustably mounted in relation to the top of the housing;
    a slide prevention bar made of a styrofoam-like material attached to the outside of the rear of the housing; and
    a lens in a frame which is adjustably mounted to the housing by means of a bolt extending through each respective end of the housing, through an adjacent arm of the lens frame and to a wing nut for locking the lens frame in relation to the housing and wherein the bolt further comprises a hole for receiving a ring which is attached to an end of the cord.

* * * * *